UNITED STATES PATENT OFFICE.

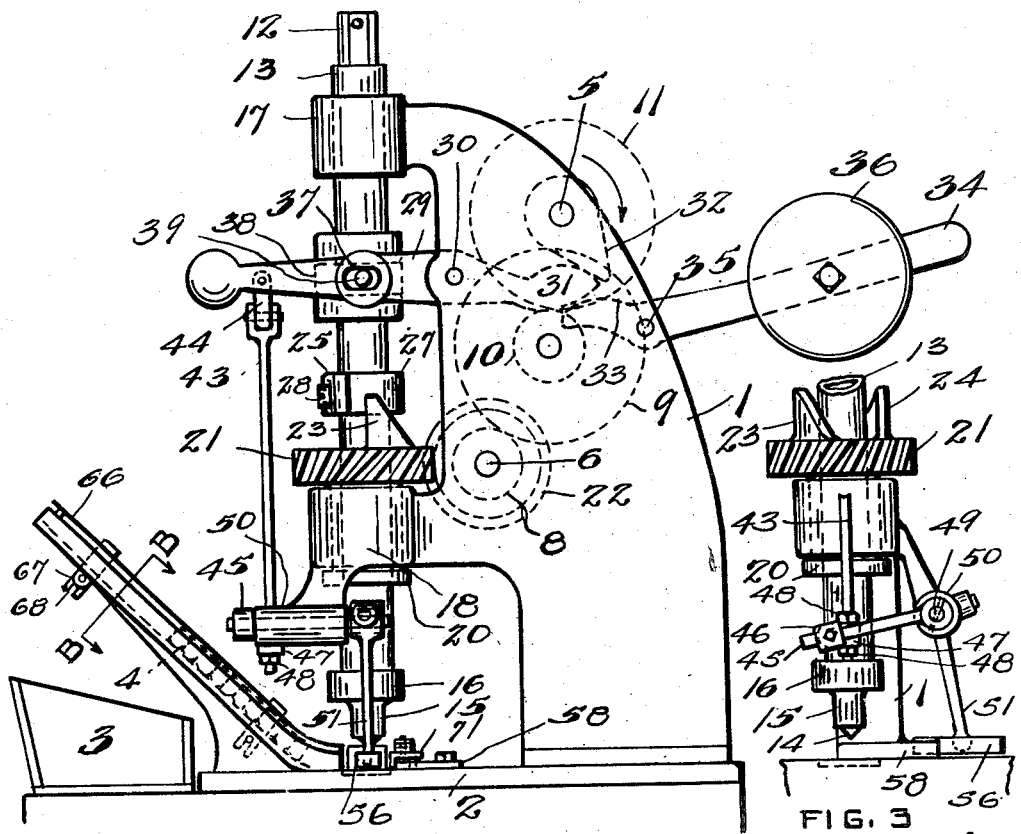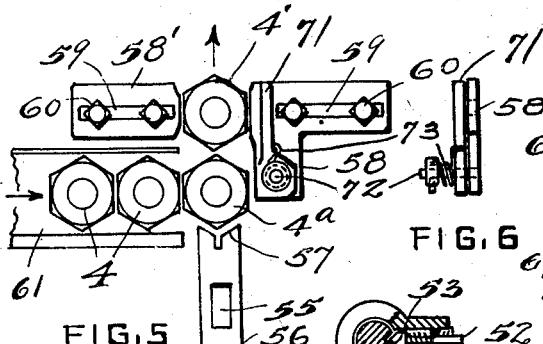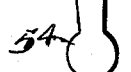

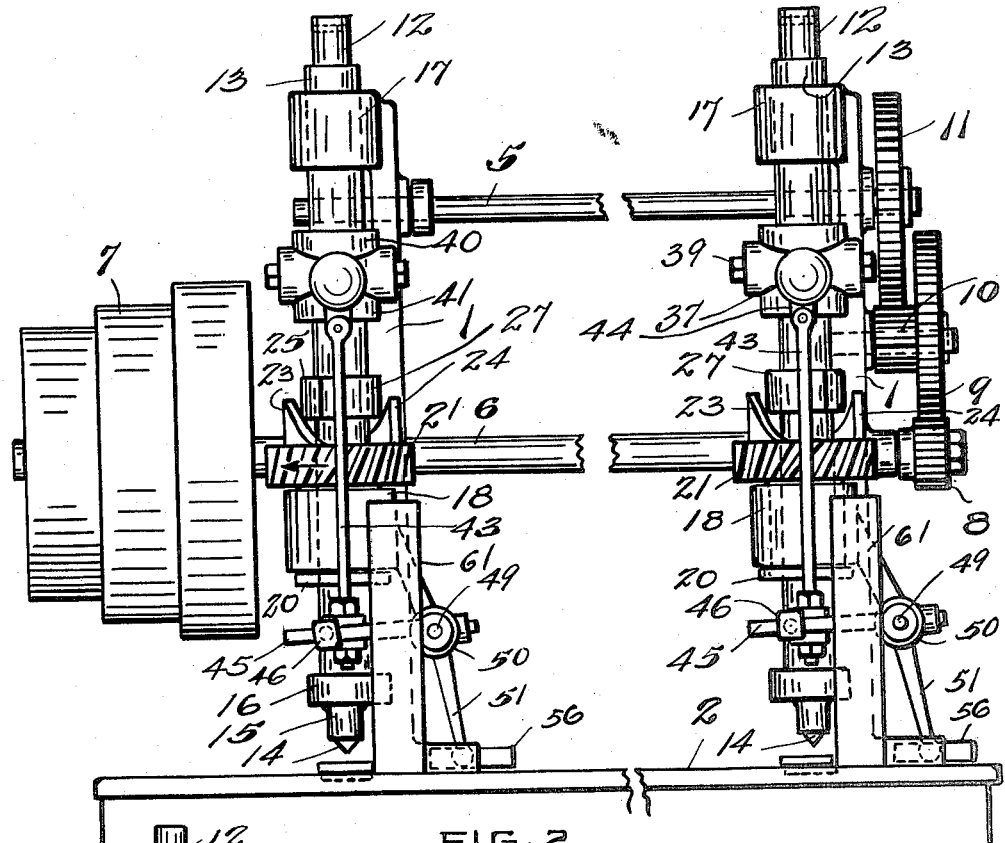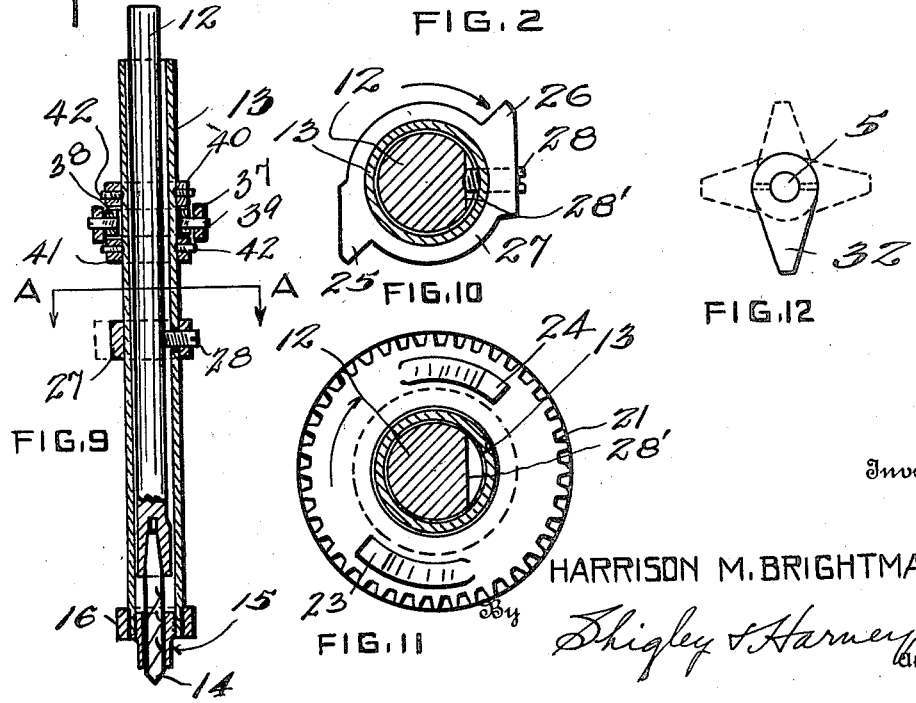

HARRISON M. BRIGHTMAN, OF COLUMBUS, OHIO, ASSIGNOR OF ONE-FIFTH TO C. W. BRIGHTMAN, ONE-FIFTH TO G. F. BRIGHTMAN, ONE-FIFTH TO H. L. BRIGHTMAN, AND ONE-FIFTH TO J. H. BRIGHTMAN, ALL OF COLUMBUS, OHIO.

BORING AND DRILLING MACHINE.

1,219,803.　　　　　Specification of Letters Patent.　　Patented Mar. 20, 1917.

Application filed September 9, 1916. Serial No. 119,195.

*To all whom it may concern:*

Be it known that I, HARRISON M. BRIGHTMAN, a citizen of the United States, residing at Columbus, in the county of Franklin and State of Ohio, have invented certain new and useful Improvements in Boring and Drilling Machines, of which the following is a specification.

My present invention relates to improvements in boring and drilling machines, and is designed particularly for the purpose of providing a machine for countersinking or boring nuts. The primary object of the invention is to improve machines of this character for this purpose in certain particulars whereby the operation of the boring or drilling spindle is controlled, and the feed of the work, or nuts, to the spindle, is accomplished, both in a simplified manner and with accuracy and despatch. The invention consists essentially in certain novel combinations and arrangements of parts of the machine whereby the boring and feeding, and other functions of the machine, are rendered reliable, accurate, and automatic, as will be hereinafter more specifically pointed out and claimed.

In the accompanying drawings I have illustrated one complete example of the physical embodiment of my invention, constructed according to the best mode I have so far devised for the practical application of the principles of my invention. The drawings exemplify a multiple machine with the spindles in parallel axes, operated from a continuous cam shaft and a continuous gear shaft for driving the spindles and actuating the feeding device, and while I have illustrated but two units, it will be understood that one only may be used, or the number may be increased, using four, six, or other numbers of units of the drilling or boring machines, according to circumstances.

Figure 1 is an end elevation of a counterboring machine constructed and operating according to the principles of my invention.

Fig. 2 is a front view of the machine of Fig. 1 showing two units or boring machines operated from the same cam and gear shafts, which shafts are shown broken to indicate the presence of intermediate machinery.

Fig. 3 is a detached view showing the lower end of a boring spindle and the work feeding device in connection therewith.

Fig. 4 is a plan view of the portion shown in Fig. 3 showing the nuts or "work" being fed by gravity to the feeding device.

Fig. 5 is an enlarged plan view showing the feeder foot in its relation to the work and the gages for holding the work while it is being bored.

Fig. 6 is a side view of one of the gages, this particular one being adjustable and spring pressed to hold the nut or work while being bored.

Fig. 7 is an enlarged detail view partly in section, of the feeder arm, illustrating particularly an escapement device which permits continued operation of the machine in case the nuts or work become clogged.

Fig. 8 is a transverse sectional view on line B—B of the feed chute in Fig. 1.

Fig. 9 is a detail view showing the boring spindle, parts being in section.

Figs. 10 and 11 show the two clutch members by which the spindle is revolved, and Fig. 12 shows the relative positions of cams for a multiple operated machine having four units.

In the preferred embodiment of my invention as depicted in the drawings, there are two units or machines and inasmuch as these are exact duplicates, I shall hereinafter designate similar parts or elements in these units by the same reference characters. Each unit is supported by a main frame portion 1 upon the bed 2, and a box 3 is provided for each machine in which the nuts 4 may be kept and from which they are taken by hand. While I shall hereinafter refer to the "work" to be counterbored or countersunk, as nuts, it will be evident that the operation of the machine is not limited to this particular class of work, but that the machine may be used in many other types of work.

Between the two end frames 1 1, when the machine is used in multiple, the continuous cam shaft 5 and similar gear shaft 6 are journaled, the gear shaft being driven from the driving pulleys 7 at one end of the machine, and the gear shaft driving the cam shaft through the train of pinions and gears as 8, 9, 10, and 11, at the opposite end of the machine. Between these two frames 1, 1, additional units may be located, all driven from the same gear shaft and cam shaft.

Each unit includes a horizontally revolved, and vertically reciprocated boring spindle, which, as best indicated in Fig. 9, comprises a solid shaft or shank 12 inclosed in the sleeve or tube 13, and the boring tool 14 at the lower end of the shank is fixed in the lower end of the sleeve by means of the bushing 15 and collar 16, thus providing a compactly arranged and self-contained boring tool. The vertically reciprocable spindle is supported in the two alined bearings 17 and 18, of the main frame 1, the sleeve 13 being journaled in the bearing 17, and a hub 20 which incases the sleeve and is loose thereon, being journaled in the bearing 18. The hub 20 is integral with the worm gear 21 which is of course loose on the spindle or its sleeve 13, and this gear 21 is revolved through the medium of a vertically arranged worm gear 22 fixed on the gear shaft 6. The boring action of the spindle and its tool is accomplished through these two worm gears 21 and 22, through medium of a pair of diametrically arranged abutments 23 and 24 projecting above the upper horizontal face of the worm gear 21 and integral therewith, and a pair of similarly arranged lugs 25 and 26 formed integral with a collar 27 which is fixed to the spindle shank 12 by means of the set screw 28 passing through the collar and sleeve 13 and engaging the flattened face 28' of the spindle shank. It will be seen that by loosening the set screw 28 the stem or shank 12 may be withdrawn from the sleeve, and the tool 14 may then be detached from the sleeve, thus facilitating the removal of the tool when it is necessary to change tools. It will readily be apparent that the contact of the lugs or abutments on the worm gear 21 with the lugs on the collar 27 forms a clutch by means of which the spindle is turned when these contact members are in proper position for engagement or clutch action.

The spindle is lowered to operative position indirectly, and is lifted to inoperative position positively. For this purpose I employ a yoked arm 29 pivoted at 30 in the frame of the machine, and formed at its rear end with a rounded head 31 which is engaged at its upper face by a cam plate 32 and at its lower face by the cam end 33 of a weighted arm 34 which is pivoted at 35 in the frame and provided with an adjustable weight 36. The cam plate is fixed on the cam shaft 5 and of course revolves therewith in the direction of the arrow in Fig. 1. The plate, cam end 33 of lever 34 and head 31 of operating lever 29 are at all times in contact as shown in Fig. 1 and it will readily be seen that the revolving motion of the cam plate 32 will depress the head 31 and end 33 and elevate the longer arm of lever 29 and the weighted arm of lever 34. Then when the cam 32 has passed from contact with the head 31, or while it is in the act of passing therefrom, the weight 36 swings the arm 34 on its pivot 35 and elevates the long, forked arm of lever 29. The lever 29 is connected to the spindle through the slotted forked portion 37, and the collar 38 whose trunnions 39 are seated in the slotted portion 37, and the collar is loose on the sleeve 13 of the spindle. The collar however is held between the two fixed rings 40 and 41 which may be held in adjusted position on the sleeve 13 by screws 42. Thus the spindle or tool is held to its work by gravity, and lifted to inoperative position by the action of the cam 32. The lifting of the spindle to inoperative position is required so that a counterbored nut 4' may be displaced and a new nut as 4ª (Fig. 5) fed to position for the action of the tool.

The feed mechanism for the nuts is actuated from the cam operated lever 29. At the front end of this lever a connecting rod 43 is connected by means of the link 44, a double pivot being used to give free motion to the link and connecting rod. At its lower end the rod is pivotally connected to the rock lever 45 by means of the adjustable block or head 46, a universal joint being provided by swiveling the sleeve 47 on the lower end of the rod between nuts 48 48. The head 46 may be fixed in adjusted position on the rock lever by means of the set screw or bolt 46', and the position of this head may be changed to vary the leverage of the lever 45. The lever 45 is fixed on the rock shaft 49 which may oscillate in the bearing sleeve 50 of the main frame, and at the end of the rock shaft opposite the rock lever 45, a feed arm 51 is fixed on the rock shaft by means of a spring pressed pawl 52 engaging in the notch or recess 53 in the rock shaft. At its lower end, the feed arm 51 is fashioned with a spherical head 54 adapted to operate in the slot 55 of the feed finger 56 which is a flat metallic plate formed at its front with inclined edges as 57 to conform to the external outline of the nuts and these edges are adapted to engage the nuts and force them into position. The feed finger or plate slides over the face of the bed plate and may be guided between fixed ways as 58 and 58'. These guides are metallic plates slotted at 59, spaced apart for the passage therebetween of the nuts, and secured in adjusted position by means of bolts 60 passed through the slots and threaded into the bed of the machine. The nuts 4 are fed to the machine through the inclined chute 61 which has an adjustable lateral guide strip 62 fixed to the chute, which is slotted at 63, by the bolt 64 and nut 65, and this strip may be moved to accommodate nuts of varying diameter. A metallic strip 66 supported from the chute by brackets 67 may be adjusted to various thicknesses of nuts by moving the slotted brackets 67 which are slotted at 68, and securing the brackets in adjusted position by means of the bolts 69 and nuts 70. The nuts are fed by gravity down the chute, and then are fed positively by the feed finger 56 at right angles to the initial movement to position between the adjustable plates 58 and 58'. A spring pressed plate 71, pivoted at 72 on the plate 58 may be pressed against the nut by means of the spring 73 to hold it in position between the gage plates 58 and 58' while the drilling or boring is being accomplished.

The operation of the machine will be apparent. With the two shafts 5 and 6 revolving, the cam plate 32 and the weighted arm 34 cause the pivoted yoke arm 29 to oscillate on its pivot, lifting the spindle from its work so that the completed nut may be displaced by one to be counterbored. When the spindle is lifted from its work, the two members of the clutch on the spindle are disengaged and the spindle stops revolving while the worm wheel 21 continues to revolve. When the spindle is lowered by the action of the weighted lever, the teeth or lugs 25 or 26 engage the abutments 23 or 24 and the spindle is again revolved.

The nuts to be bored are fed to the chute by hand and slide down the chute by gravity. The oscillation of the lever 29, through the link 44 and rod 43, oscillates the rock lever 45 which in turn rocks shaft 49 and the feed arm 51 and its finger 56 are moved to shove nut 4' out of the way and the nut 4ᵃ is shoved into position to be bored. Should the nuts become clogged and refuse to move, the feed arm 51 will be thrown out of operation as described, and the machine may continue its action without damage to itself or any other parts. The nuts are held in position by the two gages 58' and 71 while being bored, and these gages may be adjusted with relation to each other to take care of larger or smaller nuts. The travel of the feed arm 51 may be adjusted or varied by moving the block or head 46 on the lever 45 in order that different sized nuts may be fed to the boring tool, and the chute may also be adjusted for different sized nuts, in manner heretofore described. A further adjustment of the machine is accomplished by moving the weight 36 on the arm 34 to vary the pressure of the boring tool and spindle upon the nuts, and the depth of the cut or counterbore may be determined by moving the shank or stem 12 within the sleeve 13 and fixing the stem by the set screw 28. The depth of the cut is determined by the distance the tool projects through the bushing 15, and the bushing forms a brace or bearing for the tool and a presser foot for the nut, the bushing being changed as the tools are changed.

What I claim is:—

1. In a boring machine, the combination with a reciprocable tool carrying spindle and operating means therefor, of a pivoted lever connected with the spindle, a positively driven cam member engaging one arm of said lever to move the spindle to inoperative position, and a weighted lever arm engaging said first mentioned lever arm to return the spindle to boring position in the absence of the cam member.

2. In a boring machine, the combination with a reciprocable tool carrying spindle having a clutch member thereon, and a driven clutch member, of means for withdrawing the spindle from boring position and disengaging said clutch members, and means for returning the spindle to boring position whereby the clutch members are engaged.

3. In a boring machine, the combination with a reciprocable tool carrying spindle having a clutch member, and a driven clutch member, of an operating lever pivoted to the spindle, a cam engaging said lever to withdraw the spindle from boring position and disengage the clutch members, and a weighted lever engaging said operating lever to return the spindle to boring position whereby the clutch members are engaged.

4. The combination in a boring machine with a feed chute, of feed mechanism comprising a rock shaft and feed arm thereon and a feed plate co-acting with the arm, an operating lever on the shaft, a connecting rod connected to the lever, an actuating lever connected with the connecting rod and means for actuating said actuating lever.

5. In a boring machine, a combined operating and feed mechanism comprising a reciprocable tool-carrying spindle and clutch mechanism and an oscillatable feed mechanism, an operating lever for actuating these parts, means co-acting with said operating lever to disengage the clutch and withdraw the spindle from operative position, and means co-acting with said operating lever for returning the spindle to operative position and engaging the clutch and displacing a finished article with a new one.

6. In a boring machine the combination therewith of a tool carrying spindle comprising an inner stem or shank and an outer casing, means holding said casing and stem rigid with each other, means for operating said spindle, and a bushing forming a presser foot to regulate the depth of the cut.

In testimony whereof I affix my signature.

HARRISON M. BRIGHTMAN.